United States Patent [19]
Farnam

[11] 3,890,183
[45] June 17, 1975

[54] METHOD OF MAKING GASKETS AND PRODUCTS FORMED THEREBY

[75] Inventor: Robert G. Farnam, New Lisbon, Wis.

[73] Assignee: F. D. Farnam Co., Lyon, Ill.

[22] Filed: May 4, 1972

[21] Appl. No.: 250,193

Related U.S. Application Data

[63] Continuation-in-part of Ser. No. 840,171, July 9, 1969, Pat. No. 3,697,348.

[52] U.S. Cl............... 156/193; 117/68; 117/119.6; 156/320
[51] Int. Cl............................................. B65h 81/00
[58] Field of Search ........... 156/184, 191, 193, 194, 156/320, 280; 117/119.6, 119.8, 68, 77, 80

[56] References Cited
UNITED STATES PATENTS

| | | | |
|---|---|---|---|
| 1,837,682 | 12/1931 | Sehright............................ | 117/68 X |
| 2,360,830 | 10/1944 | Denman........................... | 156/193 X |
| 2,405,038 | 7/1946 | Jennings........................... | 117/68 X |
| 3,110,612 | 11/1963 | Gottwald......................... | 117/119.6 X |
| 3,210,227 | 10/1965 | Schichman....................... | 156/320 X |
| 3,655,210 | 4/1972 | Farnam............................. | 277/235 P |
| 3,661,401 | 5/1972 | Farnam............................. | 277/227 |
| 3,679,218 | 7/1972 | Farnam............................. | 277/235 R |

*Primary Examiner*—Charles E. Van Horn
*Assistant Examiner*—David A. Simmons
*Attorney, Agent, or Firm*—Mann, Brown, McWilliams & Bradway

[57] ABSTRACT

A gasket having improved sealing properties and the method of forming such a gasket wherein a continuous strip or web of gasket material is wound on a core with the core having a cross-sectional configuration corresponding to the internal configuration of the gasket being made. The web material is wound upon itself and, in the preferred embodiment, has a series of intermediate bonding layers of a fluid-impermeable polymer material which in the end product form a plurality of parallel fluid barriers to produce effective sealing. The winding of the web material on the core and the application of the polymer material to the web provides a tube which is then cut into preselected thicknesses to provide individual gaskets. Additional polymer material may be provided on the cut or exposed surfaces of the gasket is desired. The cross-sectional flange width of the gasket is dictated solely by the convolute gasket material and the polymer material layer or layers. One aspect of the improved method consists in preparing a roll of the gasket material which is to be wound on the core with the base material having applied to one or both sides thereof an adhesive coating which has been dried, at least to the extent that it will not adhere or cohere to itself when rolled upon itself, before the tube is formed. The coatings on the prepared roll may be individually tailored to provide a very thin coating on one side and a relatively thicker coating on the other side which are substantially dimensionally stable when applied to the web and when the prepared material is formed into convolute tubes.

3 Claims, 13 Drawing Figures

PATENTED JUN 17 1975
3,890,183
SHEET 1
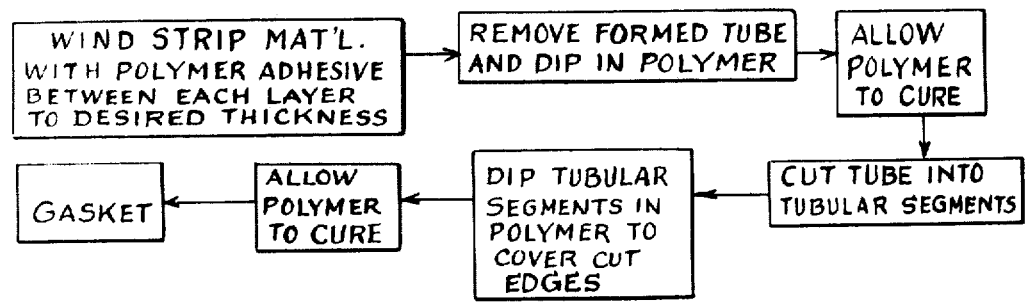
Fig. 1.
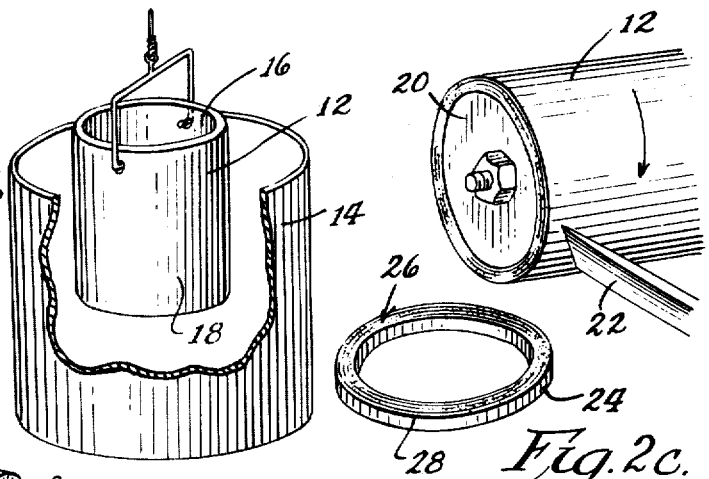
Fig. 2b.
Fig. 2c.
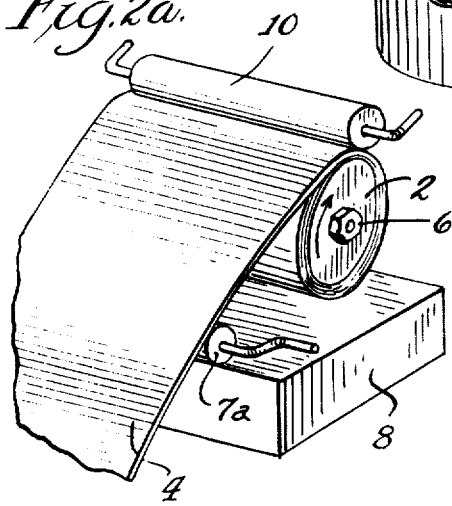
Fig. 2a.
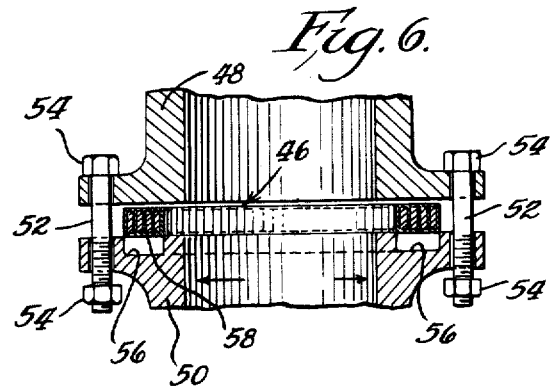
Fig. 6.

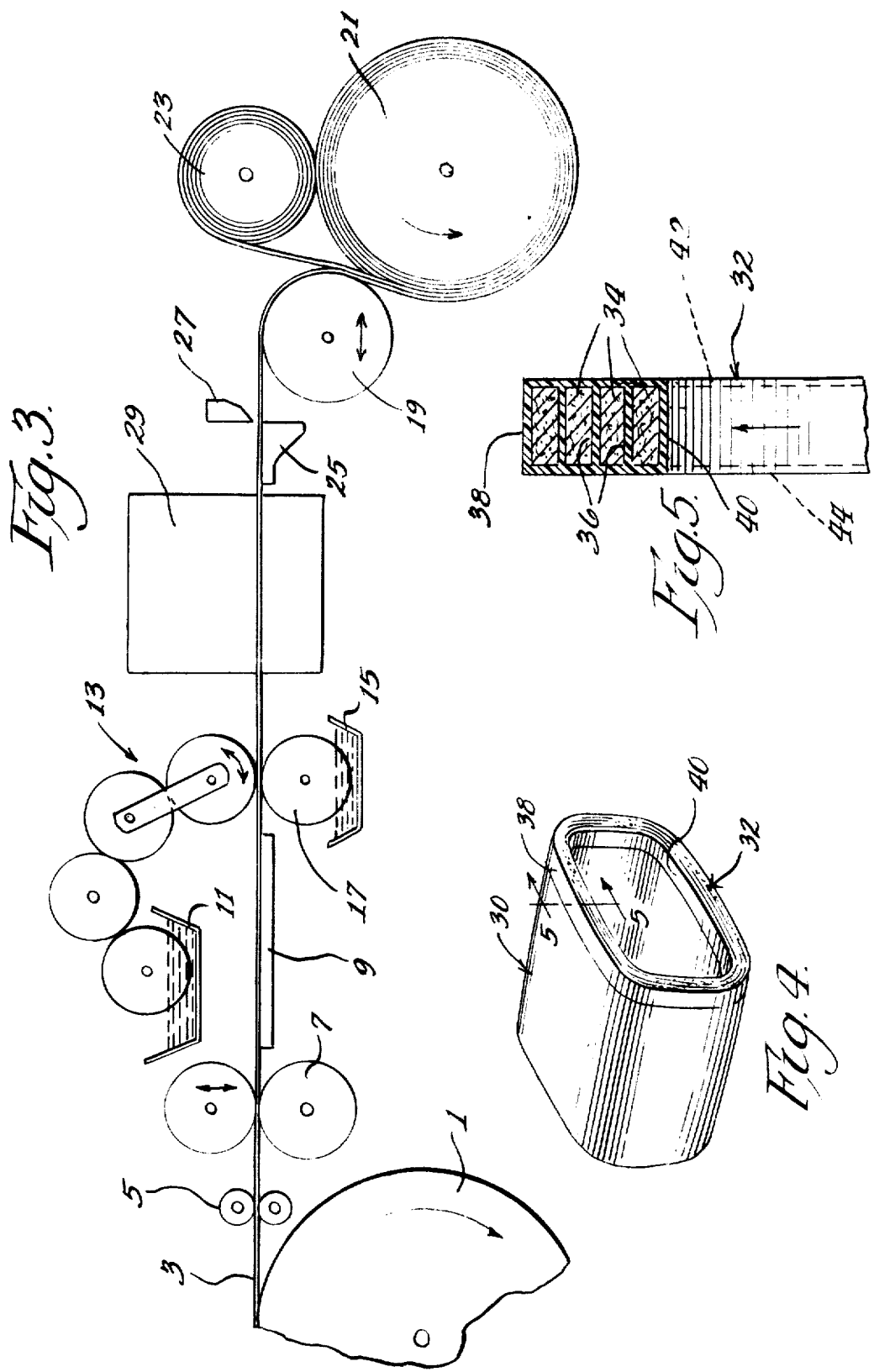

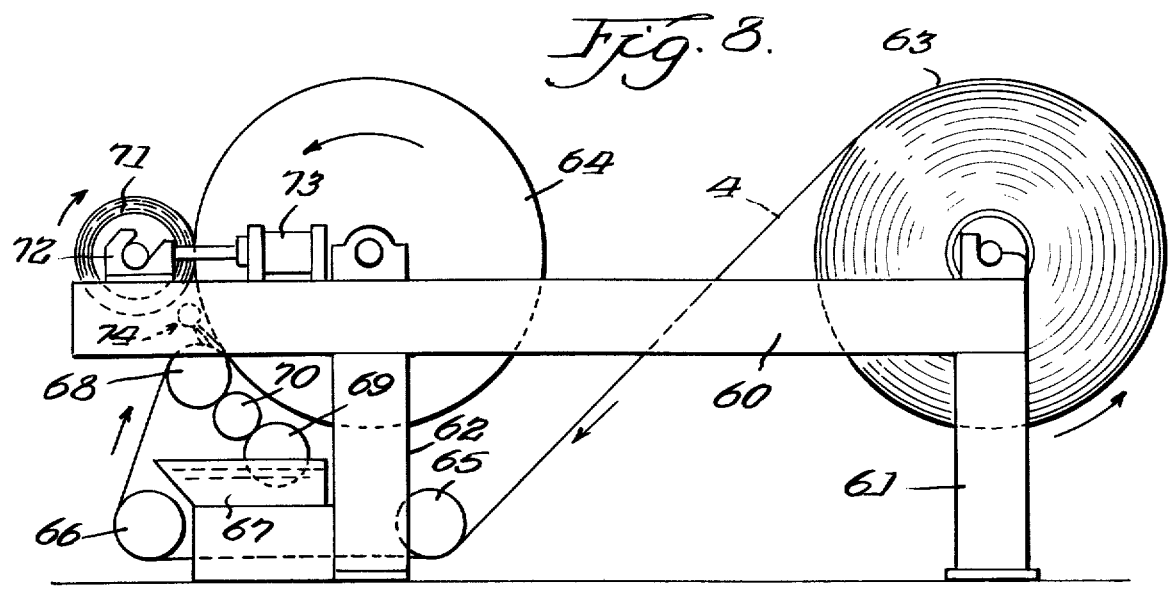
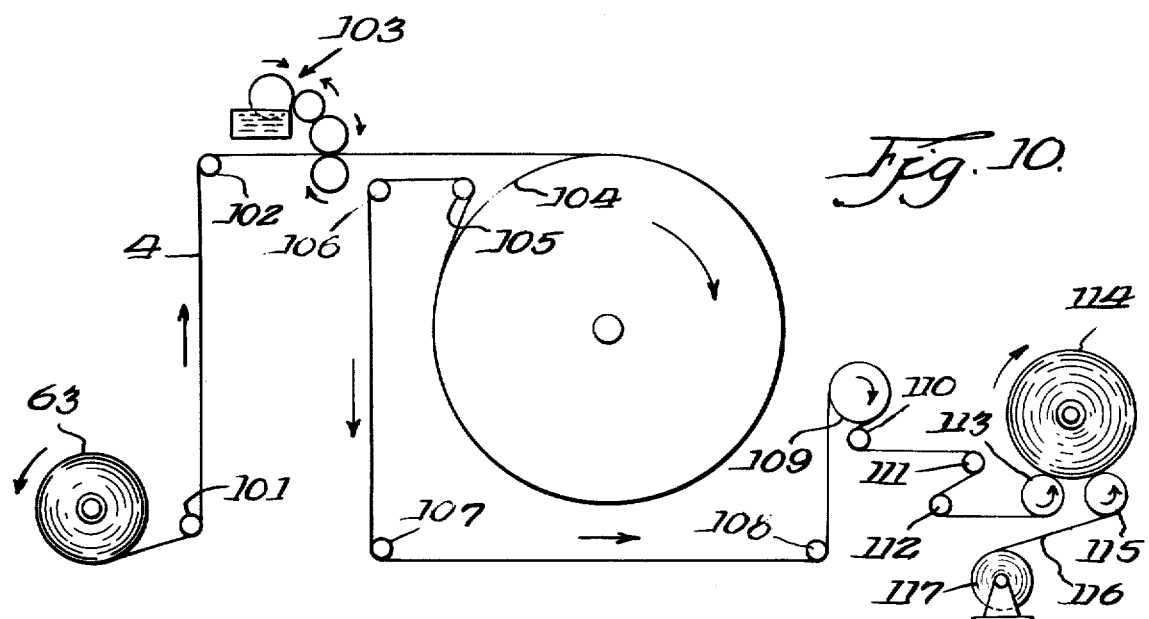
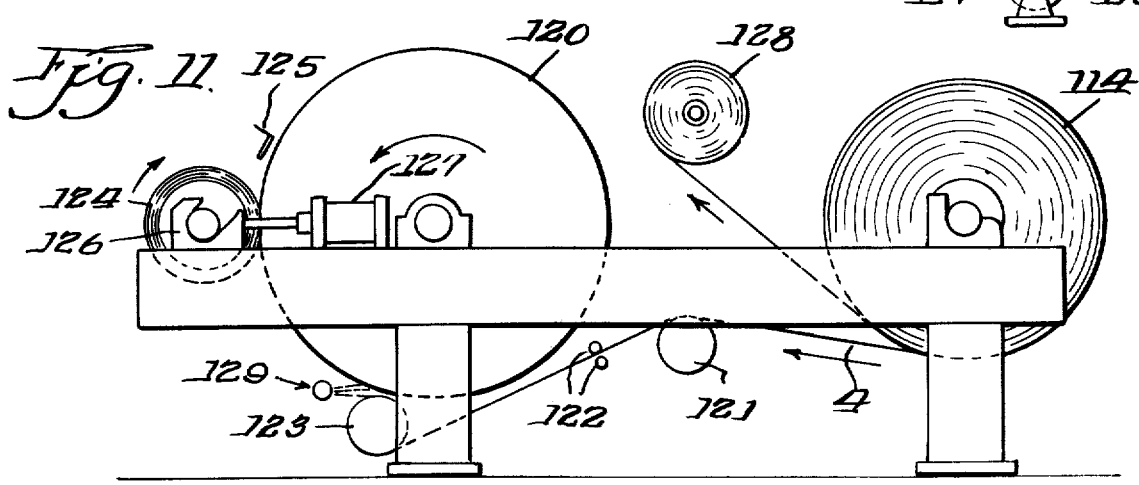

METHOD OF MAKING GASKETS AND PRODUCTS FORMED THEREBY

This application is a continuation-in-part of my application Ser. No. 840,171, filed July 9, 1969, now U.S. Pat. No. 3,697,348, granted Oct. 10, 1972.

BACKGROUND OF THE INVENTION

The prior art has, in some instances, formed gaskets and like articles by making rubber tubes either by winding rubber stock on a mandrel, or by extrusion means, and thereafter curing the formed rubber tube and cutting washer-type gaskets therefrom. It is also well known in the art to mold individual washer-like members which will have substantially the same configuration as those formed by the tube forming and cutting method.

One of the difficulties involved in making gaskets by winding web material on a mandrel resides in the fact that the bonding layer that is applied to one or both sides of the web material is difficult to handle when in the wet state, and, furthermore, the thickness of this material cannot readily be controlled because of the pressure that is applied to the material as it is being wound upon the mandrel.

There are a number of difficulties involved in making of gaskets by winding web material with a liquid adhesive on a mandrel. The principal difficulties are:

a. The bonding material is frequently difficult to handle in the wet state during the tube winding process. This process entails aligning the cut end of the web on a mandrel, winding the tube, stopping the winder, cutting the web, removing the tube and restarting the operation. In most cases, the actual winding portion of the operation is but a small portion of the total time, as adhesives used in the wet state in this type operation would be difficult to handle. The coating and/or adhesives contemplated for use in the present invention are particularly difficult to use in the wet state because they readily coat and stick to virtually everything they touch, including the operator's hands.

b. The bondline thickness is also impossible to control beyond a very minimum thickness (partly controlled by the wet bonding material's characteristics) due to the pressure and/or tension required to wind a uniform tube.

c. The wound tube (depending on the particular characteristics of the material used) is also very difficult to handle immediately after the winding operation, and prior to and during the drying operation. This particular difficulty frequently makes this operation entirely impractical wherein very thin wall tubes are required, i.e., one-sixteenth inch to three thirty-second inch wall thickness. To make the operation practical, the tubes have to be wound rapidly and removed, with the operation restarted rapidly. With the adhesive, for example, only partially set, thin wall tubes simply cannot be handled properly without major distortion.

d. Since gaskets eligible for the tube cut method may vary in flange width (wall thickness of the wound tube) from, for example, 0.060 to 1.50 inches and the sheet packing, or gasket material, from which the tube is made, will also vary in density, stiffness, etc. from one extreme to another, this would cause the complete elimination of many sizes and materials in the making of tubes using wet adhesives.

e. There are some adhesives, or bonding materials, made today that are 100% solids and which would theoretically eliminate the need to dry the tube after it was formed. This type of adhesive, if eligible, would not, however, eliminate the handling difficulties described above.

f. The type of adhesives I have found most suitable, and preferred, are water-dispersed and are described elsewhere herein (solvent type could also be used). Where drying of the adhesive is necessary, the drying problem with the use of wet adhesives, either water-dispersed or solvent-dispersed, becomes another major difficulty. The web gasket material (sheet packing) contemplated for use in this process will all be of a compactible structure; it will vary in density and permeability from very porous to extremely tight and impermeable. It is obvious that the wet adhesive system would further limit not only the types of material but also the wall thickness of the tube by the simple fact that the water or solvent used as the dispersing agent would be trapped to cause either very slow or impractical removal at the drying stage described herein.

g. Since the tube wound with the use of wet adhesive must be dried, minor and major shrinkage problems develop in the use of a wet adhesive system.

The present invention, therefore, contemplates an improved way for applying the coating material to the base web material and for controlling its thickness in the final gasket product. Novel gaskets using the method of the invention are also disclosed.

SUMMARY OF THE INVENTION

Generally speaking, in one embodiment of the invention, there is disclosed a method of fabricating a gasket or the like comprising the steps, but not necessarily in the enumerated order, of coating a web of gasket material with a substantially fluid-impermeable, curable polymer material to form a barrier layer and winding the web in selected lengths on a core to form a laminate tube wherein the core has a cross-sectional peripheral configuration corresponding to the desired internal configuration of the gasket being made. In the preferred embodiment and in order to obtain a gasket that is substantially dimensionally stable, the web is precoated, on one or both sides, with a polymer material and subsequently dried or partially cured prior to the formation of the laminate tube. The laminate tube may then be cut into a gasket of preselected thickness, depending upon the use to which the individual gaskets are to be put. The cutting operation is conducted in a plane normal to the longitudinal axis of the laminate tube. Preferably, either before or during the forming of the laminate tube, and/or after the cutting of the individual gaskets, at least one complete substantially fluid-impermeable barrier on at least one complete convolution of the gasket is provided. The formation of layers of polymer on the web, and subsequent partial drying thereof, provides a means of building a gasket having any desired ratio of polymer and gasket material. A gasket might thereby be formed wherein the flange width is determined by the number of plies of the strip of gasket material, the thickness of the gasket material, and the thickness of the bonding material (adhesive) used to form the tube; the tube having at least one completely substantially fluid impermeable barrier. In the preferred embodiments, a series of parallel fluid impermeable barriers are formed by providing a polymer layer between each of the layers of gasket material. In any of the embodiments, the exterior peripheral and interior peripheral surfaces of the tube may be coated with polymer material to provide additional fluid impermeability and also to provide conformability to the gaskets when in actual use.

BRIEF DESCRIPTION OF THE DRAWINGS

FIG. 1 is a schematic flow diagram illustrating one method of the invention;

FIGS. 2a, 2b and 2c illustrate sequential steps in the formation of a gasket;

FIG. 3 schematically shows an exemplary industrial process for providing a coated web of material for use in fabricating the preferred form of gaskets in accordance with the invention;

FIG. 4 illustrates one form that the laminate tube may take and a gasket cut therefrom;

FIG. 5 is an enlarged section of one of the gaskets of this invention taken along the lines 5—5 of FIG. 4;

FIG. 6 shows how the gasket of this invention may be utilized;

FIG. 8 illustrates a tube winding apparatus of an intermediate step of the invention;

FIG. 10 illustrates a method to coat, dry, and store web material for use with tube winders; and FIG. 11 illustrates a tube winding apparatus which uses pre-coated web material.

DESCRIPTION OF THE PREFERRED EMBODIMENTS

Figure 7:
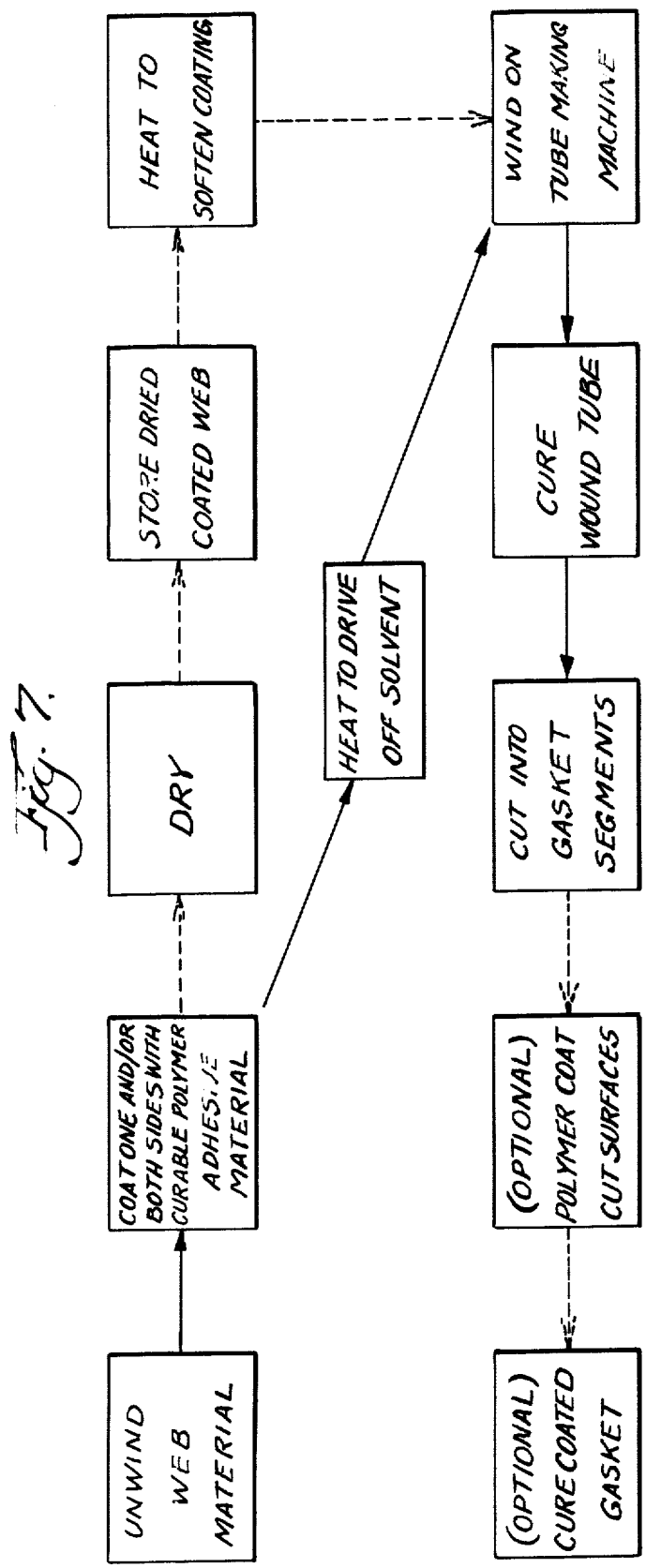
FIG. 7 is a schematic flow diagram illustrating improved methods of the invention.

Referring to the drawing wherein like numerals of reference indicate like elements throughout the several views, and referring specifically to FIGS. 1, 2a, 2b and 2c, one form of the method of the invention, which is used to produce the gaskets, is illustrated. There are various alternate procedures and resulting embodiments which will be dealt with hereinafter, but it should be emphasized at the outset that the specific descriptions with reference to the Figures are for purposes of illustration only and are not to be taken as delimiting of the invention as defined by the claims appended hereto.

Generally, the method of the invention comprises providing a core or mandrel 2, the cross section of which has a configuration to the internal configuration of the resultant gasket that is desired; it may be round, oblong or any polygonal shape. In this instance, the core or mandrel 2 takes the form of a cylindrical member having a round or annular cross section, as seen in FIG. 2a. The drum, mandrel or core 2 is rotated in direction of the arrow, winding thereon a continuous web or strip of gasket material 4 which may be any one of the well-known prior art gasket materials. The drum or core 2 is rotated by means not shown and may be secured to the revolving drum, axle, etc., as by means of nut 6. The mandrel or core 2 may be of the expanding type so that once the web of material, several plies thick, is wound on the core, the core or mandrel may be collapsed for ready removal of the thusly formed polygonal laminate tube.

In the embodiment illustrated, the web material has applied to the under surface, as by roll 7a, an adhesive-type polymer material which, upon curing, becomes substantially fluid impermeable, and which is contained in vat or reservoir 8. Superposed over core 2 is squeeze roller 10 which acts not only to evenly spread the polymer applied to the under side of the web 4 while it is being wound on the core 2, but also, depending on the pressure applied thereto, to control the thickness of the polymer coating. The excess polymer is driven to the extremities or edges of the web material where it may be allowed to run down into the receptacle or container 8.

The web of material 4 may be started on the core 2 by any well-known prior art means, and no claim is laid to the specific type of apparatus utilized in the manufacture of the gaskets disclosed herein. Winding of the material continues until the selected number of plies of the material have been placed on one another in convolute form. The number of plies depends upon the ultimate thickness of the gasket required. Thereafter, the material wound on the core 2 is separated from the continuous web 4, as by means of cutting or the like. The resulting laminate tube 12 is then removed from the core and may be, if desired, subjected to a coating or dipping process as per well-known means in the art. Where it is desired to provide such a coating (and for cut edges where desired), a polymer material such as a resinelastomer composition is used which upon curing or setting becomes substantially fluid impermeable. The dipping of the tube 12 in the polymer will provide a coating on the interior surface 16 and the exterior surface 18 of the tube 12. After curing of the polymer as by means of heat, pressure or air drying, the tube 12 is placed on a mandrel such as 20 and secured thereto. The setting of knife blade 22, with relation to the end of the tube 12, will dictate the thickness of the gasket that is eventually cut from the tube 12. It is to be understood that the means illustrated is only one of many methods of tube cutting well known in the art. The contemplated means include stationary and movalbe blades, linear and rotary cutting movement, single and multiple application, the use of saws, serrated blades, and the like. In this instance, a gasket 24 having a washer-like appearance, is cut from the tube 12. There are many instances where gaskets cut from tubes herein described could be used satisfactorily without coating the cut surfaces; conversely, there are many instances where a coating on the cut surfaces would be both desirable and/or necessary. This invention contemplates both situations.

The only limitations on size (O.D., I.D., and Thickness), for the practice of this invention, result from practical consequences of equipment costs and markets for the sizes to be made, plus the practicalities of handling, for example tubes serveral feet in diameter would be most difficult to handle. Typical sizes range from, for example 2 inches I.D. × 2¼ inches O.D. to 15 inches I.D. × 16½ inches O.D. in a gasket thickness range from 0.032 inches to 0.250 inches. Gaskets which have been coated on their bottom and top sides after being cut from a tube would have a typical coating thickness of approximately 0.0007 inches to 0.002 inches, noting that this thickness can also be varied to suit. Bolt holes, openings and changes in gasket flange configurations can be accomplished by die-cutting the gaskets cut from the tube with blanking or cutting dies before or after the gaskets have been coated on their top and bottom surfaces, noting that some may not need coating on the top and bottom surfaces, and noting further that the coating applied to the top and bottom surfaces and the methods used can be varied so as to coat not only the top and bottom surfaces but also the exposed edges that have been die-cut.

Referring now to FIG. 3, the preferred apparatus and method of forming the coating gasket material for use in making gaskets is schematically illustrated. The roll 1 of gasket material 3, such as fiber-reinforced synthetic rubber sheet packing about 0.015 inch thick is fed between the rollers 5 of a measuring device, not shown, into the nip of pull-out tension rollers 7. Superposed over web support platen 9 is polymer material trough 11 and top surface coating roll system 13 which applies a preselected thickness of polymer material, namely from about 0.0002 to about 0.005 inches of polymer material to the top side. Likewise, bottom trough 15 and bottom roller 17 coat the under side of web 3, but in actual practice appropriate doctor rolls will act in conjunction with bottom roller 17 in the same manner as coating roll system 13. The coated web is driven by drive or gripper roll 19 through oven fixture 29 and wound on roll 21 in convolute fashion. A roll 23 carrying a web of slip sheet material, such as wax paper, or the like, is disposed between layers of coated material wound on roll 21. Cutting and support platen surface 25 and cooperating knife 27, mounted for reciprocal movement completes the pre-coated roll manufacturing portion of the apparatus. Forming and cutting of the laminate tube into appropriate gaskets may take those forms already known in the art, or as heretofore described, using heat and/or pressure to activate or tackify the adhesive coating in forming laminate tubes.

While the pre-coated web embodiment of FIG. 3 illustrates the pre-coating on both sides and subsequent oven drying of the web, in some instances the coating of polymer layer may be placed on only one side of the gasket material, and drying of the polymer layer or layers either eliminated entirely or accomplished by exposure to the ambient atmosphere alone. In some instances, in which there are sticking problems where the polymer coated material is wound in a roll, a slip or separator sheet of thin waxed paper or similar material may be conjointly wound with the polymer coated material.

The FIG. 3 web coating aspect of the invention allows for the provision of as thin or as thick a layer of polymer as may be desired, and, of course, additional thickness of polymer material may be applied continuously after any given drying and/or curing step. Additionally, by providing for drying between the coating of the web of gasket material and the formation of the laminate tube, a dimensionally stable gasket is ultimately obtained, since the passage of time and/or drying allows for shrinkage and the like to occur prior to gasket formation. Obviously, the other hereindisclosed methods, wherein polymer layer application immediately precedes laminate tube formation without substantial intermediate drying, provide gaskets not having the high dimensional stability characteristics as heretofore indicated, and, under some conditions, this may not be objectionable.

By the term drying, it is intended to include the exposure to light, heat, air or other ambient and artificial environmental factors that allow the coated web material to be rolled, in convolute form, upon itself without sticking adhesively or cohesively to itself. Sometimes, the provision of a slip sheet is required to prevent the dried coated web of material from sticking to itself in web form. However, in any case, it is important that the final curing or setting up of the polymer layer take place only after the formation of the laminate tube or cut gasket. In some instances, it will be desirable to effect curing of the polymer after the individual gaskets have been cut from the laminate tube, and, in some instances, curing may be effected by actual use of the gasket in its intended environment during which time a cured polymer is obtained.

Referring to FIGS. 4, 5 and 6, more specific details of construction of a gasket 32 manufactured in accordance with this invention are illustrated. It will be seen that the core, instead of being annular, is somewhat oblong in transverse section ot thereby produce an oblong, multi-layered tube 30, the cross section of which will correspond to the ultimate configuration of the interior surface of gasket 32. The gasket 32 in this instance comprises four plies of gasket material 34 interleaved with polymer layers or barriers 36. The polymer layers 36 are formed by application of a polymer adhesive to the underside of the gasket material 34 in continuous strip form, as per methods previously described. As is fairly apparent, the coatings 38 and 40 applied to the outside and inside surfaces of the tube 30, respectively, may be formed when the oblong tube 30 is polymer coated. The polymer coatings or layers 42 and 44 may be applied as by means of dipping or otherwise coating the cut tubular segments once they are removed from the remainder of the tube 30, thereby forming a construction which integrally joins the exterior polymeric material with the parallel dams or barriers 36.

It is at once apparent that the number of plies or layers of material 34 are wholly dependent upon the number of turns or windings of the core or mandrel upon which the web of gasket is wound. The number of plies may be any number, depending upon the ultimate use to which the gasket may be put. Ideally, the bond line or polymer layer 36 will be of sufficient depth or thickness so as to provide a plurality of fluid barriers. For instance, assuming in FIG. 5 that a fluid is being sealed against the pressure or flow tendency of the fluid is in a direction of the arrow, any fluid passing through the gasket would have to first overcome five parallel, substantially fluid-impermeable barriers or dams in order to work its way to the exterior surface of the gasket.

Referring specifically to FIG. 6, an individual gasket 46 is disposed between two flanged members 48 and 50, each of which cooperates to contain a fluid exerting pressure, as indicated by the arrows. The flanged members 48 and 50 are held in fluid-tight relationship by well-known means such as through-bolts 52 and nuts 54. It will be noted that the bottom flanged member 50 has a cut-out groove or milled-out portion 56 adapted to receive and retain the gasket 46; this, however, is not essential and both flanges may be planar. Because of the exterior coatings or layers 42 and 44, the gasket 46 has great deformability and conformability so that the bottom surface 58 of the gasket 46 adjacent to the cutout 56 will conform and deform to the cross-sectional area of groove 56. Obviously, the groove 56 may be of any configuration, such as semi-circular, V-shaped, etc.

There has been illustrated and described several of the preferred forms of the invention. However, other embodiments of the invention will make themselves known to those of ordinary skill in the art, and, for the most part, such deviations will not depart from the spirit and scope of the hereindisclosed invention. For instance, the web or strip of gasket material may be applied on the core in bias or twisted fashion, in which case a plurality of askew or slanted parallel layers (in cross section) will be obtained. Other deviations will be specifically disclosed hereinafter.

The type of gasket material which may be used ideally comes in web or continuous strip form and may take a myriad of configurations and compositions. Thusly, various gasket materials such as cork, asbestos, various matrixes impregnated with vegetable fibers, as well as mineral fibers and other such materials, will be useful. Materials which have been found to be satisfactory and commercially available by the F. D. Farnam Co. are: a fiber-reinforced rubber sheet sold under the tradename "KAOPAK" No. B 1116-130; "KAO-KORK" Nos. 1652 or 57343; and "KAOBESTOS" Nos. 66013, 57090 or 63100. Thus, any number of commercially available prior art gasket materials will suffice in the practice of this invention. The thickness of such materials may bbe any suitable amount, but ordinarily from about 0.005 to 0.125 inch. Generally speaking, the ultimate use to which the formed gasket will be put will dictate the rigidity, stability and sturdiness of the various materials and components used. Utilizing the method of this invention wherein sheet gasket material had interspersed organic substances such as vegetable fibers, it was found that approximately two-thirds of the fibers will align themselves in a parallel fashion relative to the core or sheet on which or from which the gasket is fabricated. Approximately one-third of the vegetable fibers will stand on end so as to be normal to the sealing flanges in the specific environment in which the gasket is used. This is highly desirable from a torque retention standpoint. In other words, in some prior art gaskets, there is a great tendency for them to undergo stress relaxation. When this occurs, the gasket no longer functions properly. With the fibers aligned as above indicated, a superior gasket having high ability to oppose stress relaxation is obtained.

The polymer adhesive and/or polymer material layers used in fabricating the gaskets of this invention preferably is one which is characterized as having the ability upon curing to form a substantially fluid-impermeable barrier. Types of these materials which have been found satisfactory include those which are thermal setting at a temperature of about 325°–400°F.

Other polymeric materials, resins and elastomers, having low permeability to water vapor and gases and which have requisite physical and chemical properties for the particular environment in which the gasket is to be used, may be used as a substantially fluid-impermeable barrier in the form of a film, or coating applied to a portion or all of one or both surfaces of the strip, and, if desired, to the cut or raw edges of the gaskets. Examples of plastic materials which may be used are: polyamides, such as nylon 6 or nylor 6/6; polytrifluorochloro ethylene; polyesters such as duPont's Mylar; polyvinylfluoride such as duPont's Tedlar; and vinylidene chloride-vinyl chloride copolymers and polyamides such as Monsanto's AF-R-2009. The properties of these materials are given in the charts on pages 532–536 of MODERN PLASTICS ENCYCLOPEDIA, 1968 Ed., published by McGraw-Hill Inc., New York. In general, I prefer to use plastics which have permeabilites to common gases and water vapor, as measured by the aforesaid chart, of not more than about 100.

I prefer to coat the web with a nitrile or chloroprene elastomer-phenolic resin blend from a water dispersion. The elastomer-phenolic resin coating not only has superior bonding qualities but also has desirable chemical and heat resistant properties. An additional factor influencing the selection of the water-dispersed coating is the relative ease in which this carrier fluid may be removed in the drying and curing steps. Solvent systems and organic dispersions require special condensing apparatus to prevent escape of noxious liquids and vapors to the atmosphere or waste discharges. The water vapor and steam driven off in drying and curing a water-dispersed coating are clean and may safely be vented to the atmosphere.

Generally, the thickness of the polymer layer, either between plies of gasket material or as a coating on the interior or exterior of the gaskets, including cut or raw edges, will be about 0.002 –0.005 inch. Other thicknesses will be dictated by other considerations of both materials and intended field of use of the gaskets made in accordance with the invention. Other polymeric materials, resins and elastomers may be used as disclosed in United States patent to Farnam et al. U.S. Pat. No. 3,158,526. As indicated earlier, a preferred material has been found to be a water dispersion of a blend of nitrile rubber, or neoprene, and phenolic resin.

In general, after the application of the polymer material, either with or without drying and with or without a polymer adhesive or an exterior coating or layer, it is subjected to a curing process. This may take the form of application of pressure and heat, heat alone or merely air drying for a period of time in order to allow the particular material to satisfactorily cure. Where it is desired to utilize and form a plurality of discrete polymer barriers, the gasket material web may itself be coated with the material and then the web cured or left uncured, the final curing being carried out after the formation of the laminate tube. In some instances, as will be later hereinafter pointed out, adhesive layers between plies of the gasket material are not utilized. However, where it is desired to form a plurality of fluid barriers or dams, in contradistinction to the present art of laminating, it is desired to have a relatively thick bond line and, generally speaking, this bond line will be in a range of about 0.003 – 0.005 inch.

Also contemplated are gaskets which are formed by winding a continuous strip of gasket material upon itself without the use of a polymer adhesive therebetween, and wherein a single fluid-impermeable barrier is formed, either on the inside of the formed tube or on the outside of the formed tube. It may be desirable to provide the substantially fluid-impermeable barrier interleaved between several layers or plies of gasket material with nothing more where the end use of the gasket permits. Moreover, gaskets having a layer or polymer coating on the surfaces of the gasket normal to the layers making up the laminate are also contemplated. Thus, many different forms of gaskets are possible following the teachings of the hereindisclosed invention. Additionally, the laminate tube as well as the individual washer-like gaskets, once cut, need not be dip coated but may have a polymer layer or coating applied as by means of rolling the similar such procedures. It is only important in any one of these derivations that at least one complete discrete fluid-impermeable barrier or layer be provided to inhibit fluid flow through the gaskets. Each of the aforedescribed modifications of the invention are intended to be covered by the claims appended hereto.

As illustrated in FIG. 7, the formation of the gasket may be varied to provide for movement of the coated web directly through a heating step to drive off the solvent (used in the broad sense to include water or other liquids in a dispersion system) to the step of winding the web on a tube-making machine, and then cure the wound tube and subsequently cut the tube into gasket segments. As optional steps, the gaskets may then be coated on the cut surfaces with a polymer, and then the coated gaskets may be cured. This direct method is distinguished from that method which involves the drying step where the coated web is first dried and then is stored before being taken up again and passed through a heating step to soften the coating, after which the web is passed onto the tube-making machine and subsequent steps as described.

FIG. 8 illustrates a modified tube winder, as distinguished from that shown in FIG. 2a, and wherein suitable framework including horizontal members 60 and vertical supporting struts 61 and 62 afford means for rotatably mounting an uncoated roll of stock 63 and a variable speed heated drum 64. The stock roll mounting is provided with suitable air brake means for controlling the tension on the web material 4 as it travels toward the drum 64. The web 4 passes from the roll 63 under a pair of rolls 65 and 66, which carry the web beneath a fountain 67, and then passes over a coating roll 68 before passing around the heated drum 64. A fountain roller 69 picks up the polymer from fountain 67 where it is partially submerged below the level of the polymer and a metering or doctor roll 70 transmits the coating material to the roll 68 and regulates the amount of polymer for application to the web 4.

The polymer coated web 4 is disposed on the drum 64, with its coated or wet side outwardly, and passes around the drum and is wrapped onto a mandrel 71. This mandrel is removably mounted in sliding blocks 72 so that, as the coated web 4 is wrapped thereon, it may move away from the drum in accord with the increasing dimension of the wrapped web forming the tube. The movement of the mandrel away from the drum 64 is controlled by air cylinders 73 suitably connected to the sliding blocks 72 so that the wrapped web on the mandrel is maintained in contact with the drum 64. After the wrapped tube has been formed on the mandrel, the unit is stopped and the web is cut by a knife, bar or other suitable means (not illustrated).

In production, after the web is cut, the tension on the web 4 is released and a stream of air supplied from air jet 74 lifts the coated web off the heated surface of drum 64 to prevent curing in situ.

The convolutely wound tube and mandrel are removed from the unit for drying the coating by driving off any remaining solvent or carrier portion of the dispersion. This is normally accomplished with a heated air flow in a circulating oven, and the tube may be retained on the winding mandrel, or placed on a perforated drying mandrel, if it is necessary to control size and to prevent shrinkage of the tube.

If an additional polymer coating is desired on the inside and outside surfaces of the wound tube, a dipping operation, as functionally illustrated in FIG. 2b, may be performed. If this step is utilized, it is desirable to again dry the coating as hereinbefore described.

The dried tubes, whether additionally coated or not, are aired in an oven to activate or cure the polymer material. Fixtures which provide for even and rapid distribution of heat may be employed. Stainless steel mandrels are useful, both to conduct the heat in curing, and to insure that the wound tubes retain their shape.

After curing, the tube may be cut into gasket segments, as illustrated in FIG. 2c. The use of any of the well-known tube cutting processes in the art is contemplated.

It should be noted in FIG. 8 that immediately after the web 63 receives the coating material, the drying process begins, thus minimizing penetration of the solvent into the web, and creating thereby a discrete layer of coating material on the web.

Figure 9:
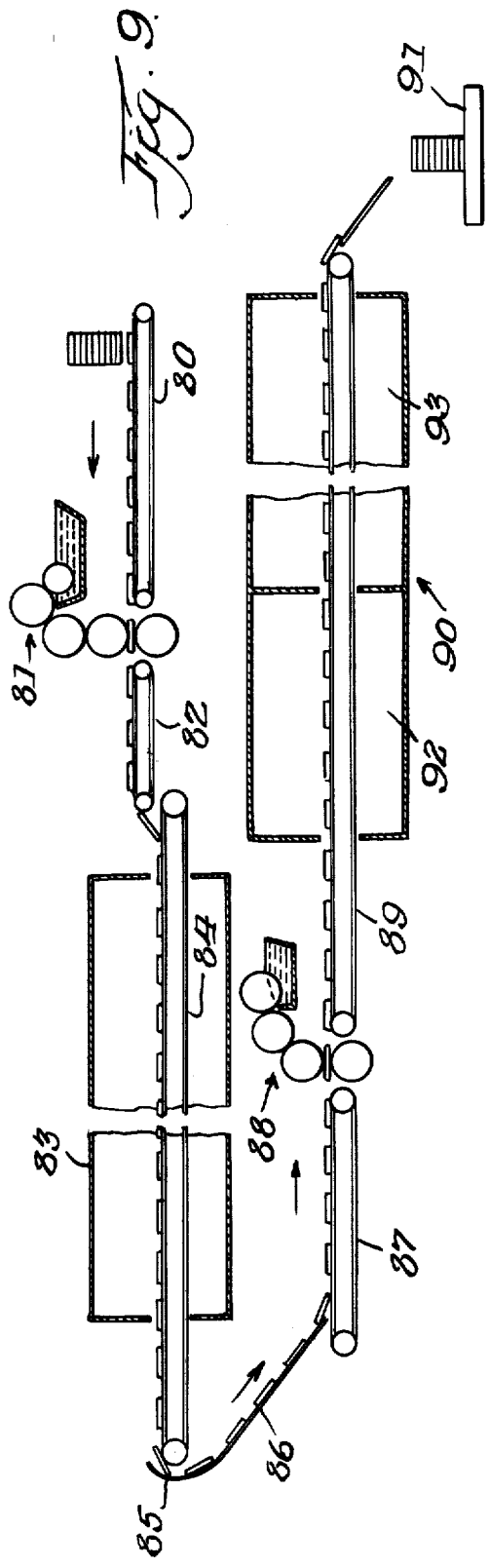
FIG. 9 schematically shows an industrial process for coating the top and bottom sides of the gasket elements.

The optional step of coating both faces of the gaskets is illustrated in FIG. 9. In this arrangement, the gaskets are loaded onto a feeder 80 which conveys the gaskets to a topside coater mechanism 81 which coats the upper side of the gaskets as they pass through the coater. A conveyor 82 carries the coated gaskets from the coater mechanism to a conveyorized drying oven 83. The conveyor 82 transfers the gaskets to a conveyor 84 which transports them through the oven for drying the coating. After passing through the dryer oven, the coated gaskets are turned over at the position 85, and the inverted gaskets are then conducted, as at 86, to a conveyor 87. The conveyor 87 transports the gaskets to a second topside coater mechanism 88 which coats the other side of the now inverted gaskets as they pass therethrough. After passing through this second coater mechanism, the gaskets enter upon a conveyor 89 which conducts them through an oven 90 to a stacking position 91 at the discharge end of the oven. This oven is a combined drying oven and a curing oven. The drying oven chamber is indicated at 92, and the curing chamber is indicated at 93. The conveyor 89 transports the gaskets (now coated on both sides) at the proper rate of travel through both sections of the oven 90.

One big advantage in my method is that a web may be precoated on one or both sides, dried, and then stored until such time as required for gasket making. An uncoated roll of stock material 63 is suitably mounted (see FIG. 10) for unwinding by means of a conventional supporting stand, and the material web 4 unwinding therefrom passes around roller 101 and 102, and thence through a coater mechanism 103. After being coated on the topside, the coated web 4 passes around a large heated dryer drum 104, encircling the major portion of the drum, and then passes around rollers 105, 106, 107 and 108 to a chill roll 109. The exterior surface of dryer drum 104 ordinarily will have a Teflon or other non-stick coating to prevent polymer adhesion to it. The web encircles the major portion of the chill roll and then goes around guide rolls 110, 111 and 112 to a nip roll 113, and thence onto the rewind roll 114. Optional means may be provided for inserting a thin waxed paper "slip" sheet 116 at the rewinding position, where it may be found that the dried bonding material may tend to be tacky in the coated roll form. The slip sheet 116 is fed from a roll 117, suitably mounted for unwinding, and passes around a roll 115 and thus into position between the rolls 113 and 114.

It should be noted that the coating arrangement of FIG. 10 may be used in tandem where it is desired to coat both sides of the web material 4. The tandem arrangement will entail use of a second coating mechanism and a second drum dryer, whereby both sides of the web can be coated and the drying operation conducted in a continuous process with the final rewind roll 114 coated on both faces of the web.

The embodiment of the invention represented in FIG. 10 provides a pre-coated web, and the pre-coating may be on one or both sides of the web, and while subsequent drying is illustrated as being performed on the heated drum 104, drying of the coating material on one or both sides can be accomplished by exposure to heated air, or be exposure to ambient atmosphere.

The coating of the web 4, in accordance with the invention as disclosed in FIG. 10, includes the provision of a layer of polymer as thin or as thick as may be desired, and when water or solvent dispersed coating materials are used, as distinguished from coating materials that may comprise substantially 100% solids, it may become necessary, when both sides of the web are to be coated, to keep the thickness of the coating on one side to a minimum, and a typical thickness for this minimum may be in the range of about 0.001 inch to about 0.0003 inch. This affords means for the coating material on the opposite side of the web 4 to dry readily. The thickness of this coating on the opposite side is heavier and may be varied to suit requirements. Where the coating on the web 4 is utilized primarily as a barrier, as hereinbefore referred to, the typical thickness of this heavier coating may be in the general range of between about 0.0002 inch and about 0.001 inch. Where it may be necessary or desirable to provide characteristics including not only the barrier function, but also, for example, to create a part having solid elastomeric type characteristics combined with compactible characteristics of sheet packing, it may then be necessary to substantially increase the thickness of the coating on the heavily coated side of the web, and this may be increased to a coating thickness in the range of from about 0.001 inch to about 0.010 inch, or possibly heavier.

It may be necessary to apply repeated coatings to obtain the heavier coatings as, for example, a coating of 0.010 inch thickness, or the procedure may be modified, for example, to apply the coating with a knife coater instead of the roll coater. By drying the coating material as applied on one or both sides of the web material before the laminated tube is formed by the wrapping procedure described, the difficulties associated with drying the formed tube are completely eliminated and a substantially dimensionally stable gasket is obtained. A major advantage of using a coated web material, wherein the coating is predried, is that the coating material can be dried many times faster than would be possible if it were dried after being wound to form the tube.

FIG. 11 illustrates a type of tube winder that forms the tubes from a pre-coated and dried web of gasket material. This operation would follow the operation illustrated in FIG. 10. In FIG. 11, the coated web of material 4 unwinds from the coated roll of stock 114. It will be noted that the stock roll, as well as a variable speed heated drum 120, is mounted for rotation and supported in a frame structure similar to the frame structure 60, 61 and 62 illustrated in FIG. 8. The coated web 4, as it leaves the roll 114, passes over a roller 121 through a pair of measuring rolls 122, and then around a roller 123 to reverse its direction before passing around the heated drum roller 120. The web 4 travels around a substantial portion of the heated drum, and then is wrapped onto a mandrel 124. The measuring rolls 122 determine the length of the web material to be utilized for a particular size tube to be wound onto the mandrel. A web clamp and cut-off bar 125 is provided for the web material just ahead of the point where the web approaches the mandrel 124. This enables the web 4 to be squared off and placed during the start-up of the winder mandrel to form the tube. The mandrel is rotatively mounted in sliding blocks 126 supported on the frame structure, and these sliding blocks are connected with air cylinders 127 which apply the necessary pressure initially to tack the first wrap, and then hold the pressure at the nip between the wrapped tube and the drum 120, during the tube forming operation. After the wrapped tube has been formed on the mandrel, the unit is stopped, the web is cut by means of the bar 125, and then advanced with the drum 120, which comprises a driver roll. The pressure is released and the wrapped tube is removed. The tension on web 4 is released and air jet 129 cools the web in the same manner as desired for air jet 74 in FIG. 8. It is contemplated that the mandrels upon which these tubes are formed shall comprise plain steel tubes that slide over an expanding type of shaft. A sufficient inventory of such tubes is maintained to keep pace with the tube winding operation, since this is very rapid and is completed at a relatively fast rate. Further, these same steel tubes, wrapped with sheet packing may be used in the subsequent curing operation.

It should be noted that where a "slip" sheet has been utilized in the wound roll of coated stock 114, the slip sheet may be removed from the stock roll simultaneously with the unwinding of the web 4, and the sheet wound onto a roll 128 automatically as it is removed from between the rolls of the stock material. Where the coating material is such that it creates problems of sticking when wound in a roll, the thin waxed paper slip sheet may be used as a separator between the rolls of the coated web. Thus, the thin waxed paper slip sheet is provided primarily to prevent the coated web of material 4 from sticking to itself when wound into roll form. An optional feature of the invention comprehends the placement of the coated web material used to form the laminated tube on a bias to obtain a spirally wound tube in the final product.

Materials, as referred to hereinbefore, made from granulated cork bonded with glue or resin, granulated cork mixed with various elastomers, asbestos paper, asbestos millboard, and various elastomers such as chloroprene, nitrile, natural rubber or GR-S (styrene butadiene rubber), reinforced with organic or inorganic fibers such as asbestos or vegetable fibers, will be useful in forming the present gasket. Materials such as KAOPAK, KAOKORK and KAOBESTOS are all made in web or sheet form, and all have a grain resulting from the fact that a greater percentage of the fibers lie parallel to the length of the sheet, as manufactured, rather than parallel to the width of the sheet. Typically, the difference would be in the range of 2:1, which is reflected in the tensile strength, since this is normally higher parallel to grain than it is across the grain. This characteristic contributes an important advantage to the gaskets cut from the tubes formed, as herein described, since a significant number of the fibers are disposed at or substantially at right angles to the lines of clamping force when the gasket is clamped between opposing flanges, as applied in use, thereby to provide additional torque retention to the clamped gasket in service. This condition may vary from one material to another, but is important to recognize that the gasket must not only seal, but then must maintain the sealing properties largely by virtue of its structure and its own stress relaxation properties, which is referred to herein as "torque retention". The thickness of all such materials may be any suitable amount, but ordinarily may vary in the range of from about 0.005 inch to about 0.025 inch.

The application of the gasket in use, as shown in FIG. 6, has been described as disposed between two flanged mambers, each of which cooperates to contain a fluid-exerting pressure, indicated by the arrows in that Figure. One of the flanged members has a cut-out groove to retain the gasket, and through-bolts hold the flanged members in fluid-tight relationship. Since the gasket material is compactible and compressible, the gasket thickness and groove depth relationship can readily be coordinated so as to compact the gasket to a point where it completely seals the opposing flange members and maintains this sealing relationship. The gasket thickness is always greater than the depth of the groove in the one flange, and the flanges may be clamped in metal-to-metal relationship in respect to each other.

Tailored gaskets may be formed by the method of this invention which have their conformability and sealing characteristics supplied in a great part by the coating material and have their shape dictated by the nature of the web which may be wound or convoluted as desired. Furthermore, the coating thickness can be controlled from a fraction of a thousandth of an inch to several thousandths of an inch in thickness. Thus, this invention makes it possible to tailor the structure of the material to be convoluted to suit a wide variety of specific needs.

Since the web of material will be coated with a fluid-impermeable curable polymer material and the coating will be for the most part a blend of elastomer and resin, it is unnecessary to restrict the choice of materials used for the web to those commonly thought of as packing or gasket materials. While such materials known to the art are always suitable, various papers, fabrics, films and other substrates may be used if they exhibit desired structural characteristics to support the coating material and to be convolutely wound. In accordance with this invention, the polymer material coats, rather than penetrates or saturates the web; and since coating of the entire surface of the web is sufficient to provide sealing characteristics, penetration is not necessary or particularly desirable.

Immediate advantages are realized over the conventional wet coating process used to make convolutely wound gaskets. In the prior art wet coating process, typified by Judd U.S. Pat. No. 2,175,399, the amount of polymeric material in any given convolute winding will depend upon the winding pressure, and the temperature, viscosity, etc., of the wet polymeric material. By contrast, in my process the convolute winding is performed with the polymeric material on the coated web being in a dry state and with preselected stabilized dimensional thickness, and, in the winding operation, the polymeric material is heated sufficiently so that it will bond adequately when the convolute tube is formed with suitable winding pressure. Not only is the process far easier to handle in production because of the stabilized form of the coated web prior to winding, but just as important is the fact that the convolute tube from which the gaskets are to be made can be "tailor-made" with a wide variety of bond thicknesses to provide the desired characteristics for the gasket to be made therefrom.

A second advantage is uniform bond thickness. In the prior art wet winding processes, the amount of adhesive applied in bonding is dependent upon many variables. The viscosity of the adhesive, the web tension and the roll pressure effect the bond thickness. The normal start and stopping operations of an ordinary tube winder are such that great care must be exercised to attempt to provide a uniform coating. The prior art tubes achieve fairly uniform bonds only when maximum web tension and roll pressure is applied to squeeze virtually all of the adhesive out of the tube to form an extremely thin bond line. This is a very sloppy operation with the adhesive being forced out of the open ends of the tubes, on the rollers and in other areas of the winding equipment.

The use of the pre-dried coated web of the present invention eliminates the problems of bond line or coating thickness by presenting a dimensionally stable coating which resists flow and which is not squeezed out from between convolutions. By use of a very thin coating on one side and a thick coating on the other side, bond line thickness may be made essentially equivalent to the thick coating. The very thin coating acts to seal the web from moisture and to shrink or dimensionally stabilize it and also effectively provides a primer surface that is quite conducive to bonding the thicker coating in convolute fashion. Since the sheet is dried to a stabilized condition, it may be used on a tube winder at maximum winding speed and pressure without fear of dimensional change.

The bond lines formed in the wet winding process have been generally extremely thin. With the dry coated process of the invention it is now possible to achieve relatively thick bond lines. With this feature, gaskets with polymer material in greater than the web thickness may be formed in which the principal constituent is the fluid-impermeable polymer coating material rather than the material web.

It should be noted that, when a carrier material has been coated on both sides to form an intermediate product in which one of the coated sides has a coating substantially greater than the other, the dual coated web may be dried more easily and completely in a drying oven by permitting the volatiles to escape from the web primarily through the relatively thin coating of polymer material. Furthermore, it should be noted that, when the drying is effected on a heated dryer drum, rather than in an oven, the lightly coated side of the web is against the dryer roll so that the drying operation is always, to a substantial extent, radially outwardly through the just applied heavier coating. The reason for coating both sides of the carrier sheet, evenly or unevenly, to form a storagable intermediate product, is so that the carrier material, which to some extent is ordinarily hydroscopic, is sealed off from the environment in which it is stored and thereby is maintained substantially dimensionally stable. Of course, when intermediate storage of an intermediate product is not contemplated, there is less occasion for the dual coating, and the procedure of FIG. 8 may be followed, although dual coating does facilitate tube forming.

Various modifications of the procedure will be apparent to those skilled in the art.

I claim:

1. The method of making a convolutely wound gasket characterized by having alternate discrete layers of carrier material and a fluid-impermeable polymer material comprising:
   a. taking a web of a carrier material,
   b. coating one side of the web with a relatively thin thickness of fluid-impermeable curable polymer material with a typical range of about 0.0001 inch to about 0.0003 inch,
   c. drying the coated web to drive off volatiles,
   d. coating the other side of the web with a predetermined greater thickness of fluid-impermeable curable polymer material in the range of about 0.0002 inch to about 0.010 inch,
   e. drying the dual coated web by driving off the volatiles to provide a dimensionally stabilized, substantially adhesion-free and cohesion-free, coated sheet,
   f. heating the coated sheet to soften the coatings,
   g. winding the softened coated sheet in convolute fashion with sufficient tension to form a tube with discrete fluid-impermeable barriers of uniform thickness,
   h. cutting the tube into individual gaskets, and
   i. curing the fluid-impermeable polymer material.

2. The method as set forth in claim 1 wherein by use of a heated drum drying means in step e the volatiles are driven from the web material to a substantial extent through the just applied coating of the immediately preceding step.

3. The method as set forth in claim 1 wherein the cut edges of the individual gaskets are coated with fluid-impermeable curable polymer material and are cured.

* * * * *

PO-1050
(5/69)

UNITED STATES PATENT OFFICE
CERTIFICATE OF CORRECTION

Patent No. 3,890,183            Dated June 17, 1975

Inventor(s)     Robert G. Farnam

It is certified that error appears in the above-identified patent and that said Letters Patent are hereby corrected as shown below:

```
Column  6, line 23, "understide" should be --underside--;
Column  7, line 23, "bbe" should be --be--;
Column  7, line 24, "0.125" should be --0.025--;
Column  7, line 61, "nylor" should be --nylon--;
Column  8, line 22, "0.002" should be --0.0002--;
Column 11, line 25, "0.001" should be --0.0001--.
```

Signed and Sealed this

*sixteenth* Day of *September 1975*

[SEAL]

Attest:

RUTH C. MASON
*Attesting Officer*

C. MARSHALL DANN
*Commissioner of Patents and Trademarks*